United States Patent [19]

Vinatieri

[11] 4,226,702

[45] Oct. 7, 1980

[54] ADDITION OF WATER TO EMULSIONS TO ACCELERATE COALESCENCE

[75] Inventor: James E. Vinatieri, Bartlesville, Okla.

[73] Assignee: Phillips Petroleum Company, Bartlesville, Okla.

[21] Appl. No.: 926,478

[22] Filed: Jul. 20, 1978

[51] Int. Cl.³ ...................... C10G 33/00; C10G 33/04
[52] U.S. Cl. .................................... 208/188; 208/187
[58] Field of Search ................ 208/187, 188; 252/333, 252/855 R

[56] References Cited

U.S. PATENT DOCUMENTS

| | | | |
|---|---|---|---|
| 1,727,164 | 9/1929 | Fischer, Jr. et al. | 252/333 |
| 2,310,673 | 2/1943 | Blair, Jr. | 208/177 |
| 2,446,040 | 7/1948 | Blair, Jr. | 208/188 |
| 3,396,100 | 8/1968 | Pettefer | 208/188 |
| 3,469,373 | 9/1969 | Lavery et al. | 208/187 |
| 3,888,760 | 6/1975 | Ebert | 208/187 |
| 3,977,472 | 8/1976 | Graham et al. | 252/855 R |
| 4,014,801 | 3/1977 | Fullinwider et al. | 252/330 |
| 4,029,570 | 6/1977 | Coffman et al. | 208/188 |

OTHER PUBLICATIONS

"Treating Oil Field Emulsions", Petroleum Industry Series, 1st Ed., Ch IV pp. 29–34, issued by Univ. of Texas (1949).

*Primary Examiner*—Delbert E. Gantz

[57] ABSTRACT

Opaque macroemulsions comprising oil and brine are diluted with water to an electrolyte concentration at which rapid coalescence into three phases, oil, a transparent microemulsion, and water is achieved. This is of particular utility in post-primary oil recovery processes wherein said opaque macroemulsions are produced as effluents from producing wells. The opaque macroemulsions are collected and oil therein recovered by dilution as described herein.

11 Claims, 4 Drawing Figures

ADDITION OF WATER TO EMULSIONS TO ACCELERATE COALESCENCE

SUMMARY OF THE INVENTION

It is an object of this invention to separate oil from an oil-containing opaque macroemulsion;

It is yet a further object of this invention to facilitate coalescence of an opaque macroemulsion comprising brine and oil into three phases, an upper oil phase, a middle transparent microemulsion phase, and a lower brine phase;

It is still yet a further object of this invention to recover oil from said transparent microemulsion phase; and It is still yet a further object of this invention to improve the economics of transparent microemulsion tertiary oil recovery.

In accordance with this invention, an opaque macroemulsion comprising oil and brine is diluted with water to an electrolyte concentration at which rapid coalescence into three phases, oil, a transparent microemulsion, and water, is achieved.

BRIEF DESCRIPTION OF THE DRAWINGS

In the drawings, which form a part hereof.

DESCRIPTION OF THE PREFERRED EMBODIMENTS

Figure 1:
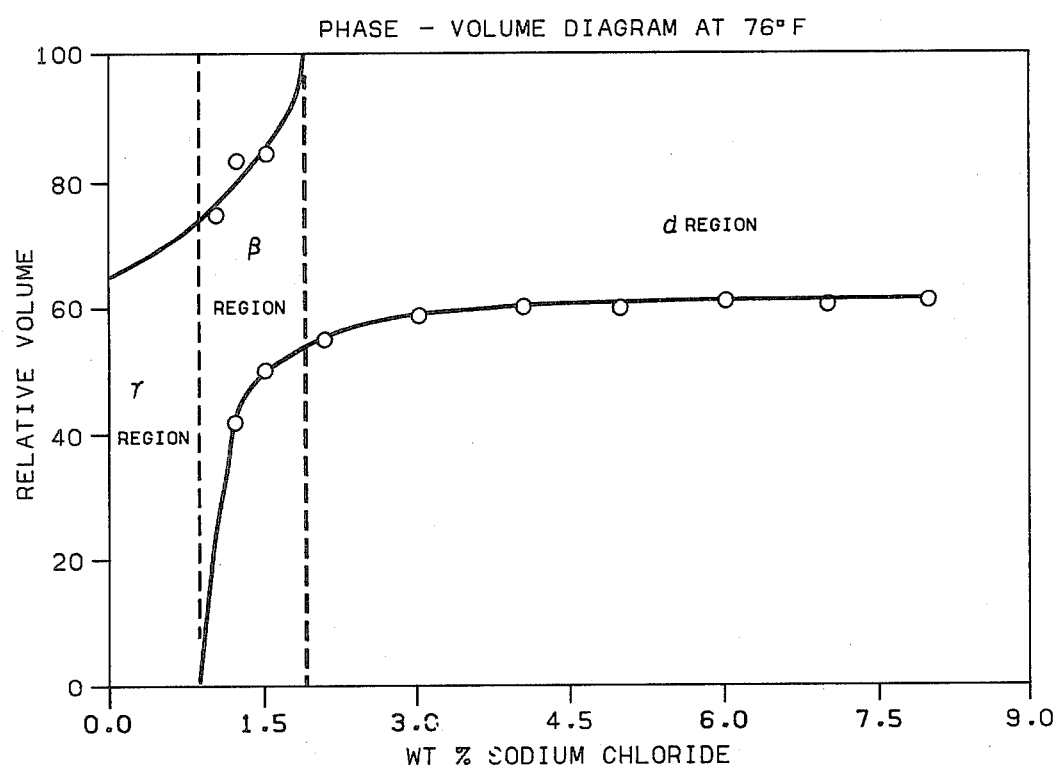
FIG. 1 is a phase-volume diagram plotting the degree of salinity versus the relative volumes of the various phases at 76° F.

Recovery of oil utilizing transparent microemulsions produced in situ is disclosed in Hessert et al, U.S. Pat. No. 4,079,785, issued Mar. 21, 1978, the disclosure of which is hereby incorporated by reference. It is also known to produce transparent microemulsions above ground and inject them into the ground to sweep oil in a subterranean reservoir toward a producing well. The transparent microemulsion will be dissipated to varying degrees during the course of its travel from the injection well to the producing well.

In those instances where a portion of the surfactant used to produce the transparent microemulsion reaches the production well, the possibility exists for producing opaque macroemulsions of brine and oil. It would be desirable to recover the oil from this opaque macroemulsion; however, it is slow to coalesce. In formations where the concentration of electrolyte in the connate brine is higher than the concentration of electrolyte in the transparent microemulsion, or where the connate brine contains appreciable concentrations of multivalent cations, such as calcium and magnesium, the opaque macroemulsion is particularly slow to coalesce and the rate of coalescence can be accelerated by diluting the opaque macroemulsion with fresh water. Generally, the sodium chloride equivalent concentration in the opaque macroemulsion will be at least 2 percent by weight more generally at least 3 percent by weight (based on the weight of the water in the opaque macroemulsion). If divalent ions are present, they exercise about a 15 fold greater effect and thus the sodium chloride equivalent concentration is the actual NaCl concentration plus about 15 times the divalent ion concentration. For instance, a composition having a NaCl concentration of 1 percent and a divalent ion concentration of 0.1 percent would have a sodium chloride equivalent concentration of 2.5 (i.e., $2.5 = 1 + 15 \times 0.1$).

By transparent microemulsion is meant a composition comprising oil, surfactant, water and electrolyte. Optionally, a cosurfactant is present as described in said Hessert et al patent. The presence of a cosurfactant is preferred. Applicable surfactants and cosurfactants are as described in said Hessert et al patent, the preferred surfactant being a petroleum sulfonate and the preferred cosurfactant being an alcohol, preferably a $C_4$ or $C_5$ alcohol such as isobutyl alcohol. Preferred equivalent weights for the sulfonates are within the range of 375 to 500. The electrolyte is preferably predominantly sodium chloride as described in said Hessert et al patent.

If desired, the degree of dilution required to give the optimum speed of coalescence can be determined as follows. A series of samples of the opaque macroemulsion are diluted with specified aliquots of fresh water to produce a series of mixtures so as to yield variable compositions, for instance, ranging from 10 to 90 percent opaque macroemulsion by volume. Samples are then agitated thoroughly and the time elapsed between the end of the agitation and coalescence of the emulsion into distinct oil, transparent microemulsion and water phases is recorded. This can be plotted or the sample exhibiting the shortest coalescence time can be taken as possessing the optimum salinity for rapid coalescence.

Figure 2:
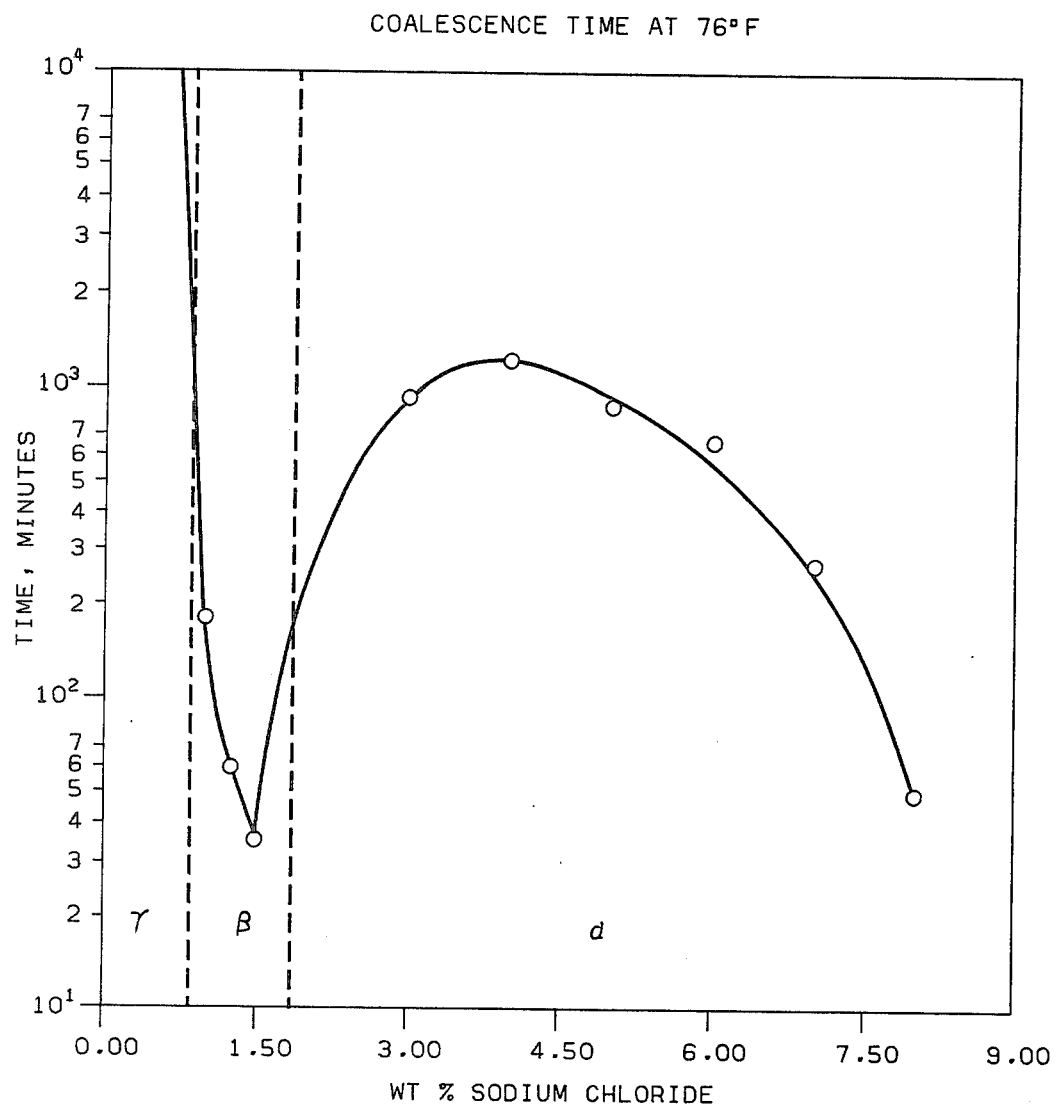
FIG. 2 is a diagram plotting the time for coalescence at 76° F. versus the degree of dilution as evidenced by the salinity.
Figure 4:
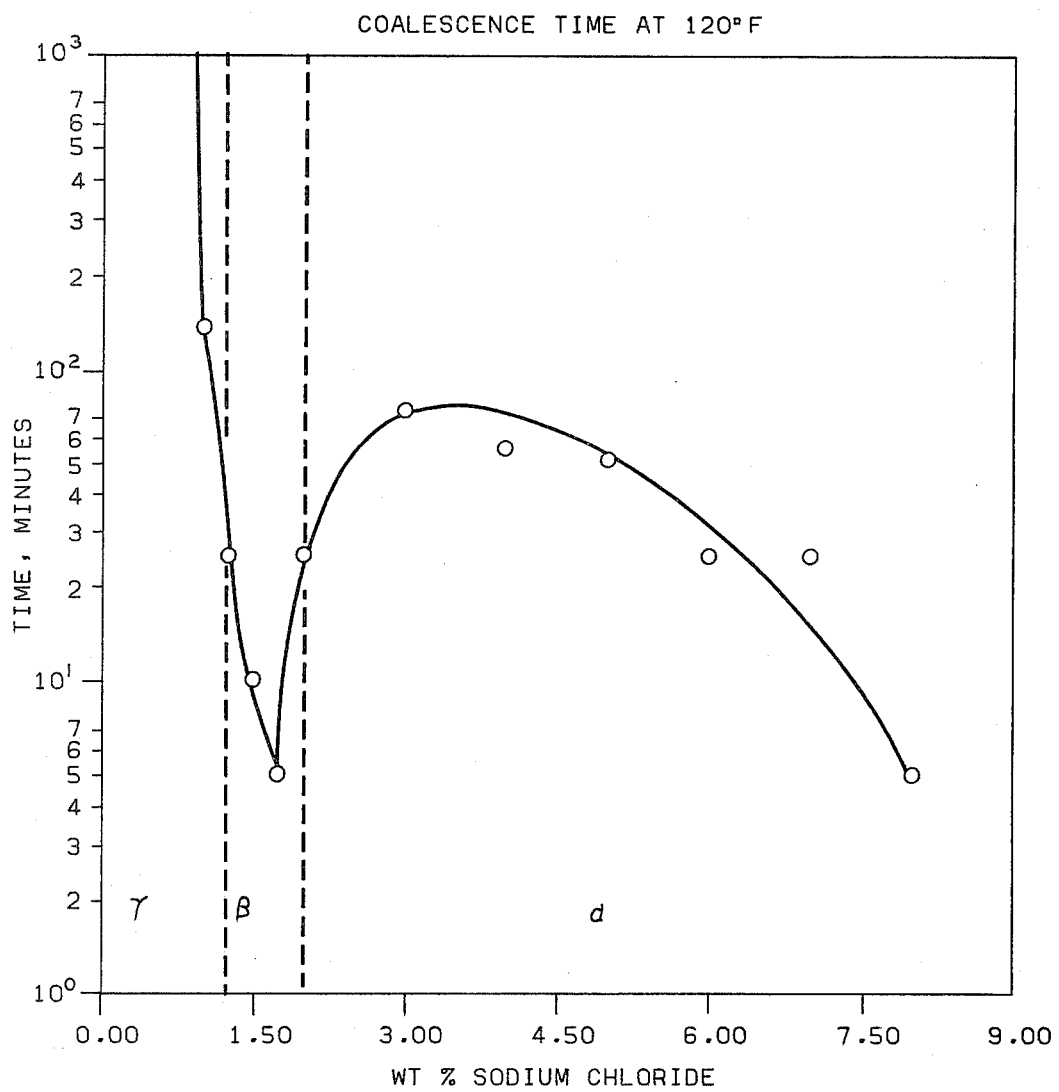
FIG. 4 is a graph similar to FIG. 2 at 120° F.

Since it is known that heat affects the rate of coalescence, the inventive process, and the above described test procedure, can be carried out at an elevated temperature, if desired. This is illustrated in FIGS. 2 and 4 (note a different scale for FIG. 4 because of the more rapid coalescence).

EXAMPLE I

An oil-containing transparent microemulsion was prepared by mixing 160 ml of North Burbank Unit No. 97 crude oil, 19.2 g of Witco 10-410 petroleum sulfonate and 9.6 g of isobutyl alcohol. An opaque macroemulsion was prepared by mixing said oil-containing transparent microemulsion with 3 weight percent NaCl brine in a volume ratio of 9.5:14.5 followed by vigorous agitation to effect emulsification, thus simulating the formation of an opaque macroemulsion due to mixture of a transparent microemulsion and oil during tertiary oil recovery.

Individual aliquots of this opaque macroemulsion were diluted, respectively, with portions of water to give the sample compositions listed in Table I. Thus, e.g., sample 1 was prepared by thoroughly mixing 10 volumes of emulsion with 90 volumes of water. This mixture was allowed to stand at room temperature and the coalescence time was recorded in minutes. Samples 2-10 were similarly prepared and examined.

TABLE I

| Sample No. | Volume % Emulsion | Volume % Water | Salinity[a] | Coalescence Time R.T. (Min.) |
|---|---|---|---|---|
| 1 | 10 | 90 | 0.3 | >1500 |
| 2 | 20 | 80 | 0.6 | >1500 |
| 3 | 30 | 70 | 0.9 | >1500 |
| 4 | 40 | 60 | 1.2 | >1500 |
| 5 | 50 | 50 | 1.5 | >1500 |
| 6 | 60 | 40 | 1.8 | 30 |

TABLE I-continued

| Sample No. | Volume % Emulsion | Volume % Water | Salinity[a] | Coalescence Time R.T. (Min.) |
|---|---|---|---|---|
| 7 | 70 | 30 | 2.1 | 12.5 |
| 8 | 80 | 20 | 2.4 | 1200 |
| 9 | 90 | 10 | 2.7 | 1500 |
| 10 | 100 | 0 | 3.0 | >1500 |

[a]Salinity is based on the weight ratio of NaCl:H₂O rather than weight ratio NaCl:-weight of total composition.

As shown by the results in Table I (see sample numbers 6 and 7), the coalescence time was dramatically reduced in the salinity range of 1.8 to 2.1. Outside said salinity range of 1.8 to 2.1 (see sample numbers 5 and 8), the coalescence time was dramatically increased to greater than 1500 minutes at a salinity of 1.5 and 1200 minutes at a salinity of 2.4.

Figure 3:
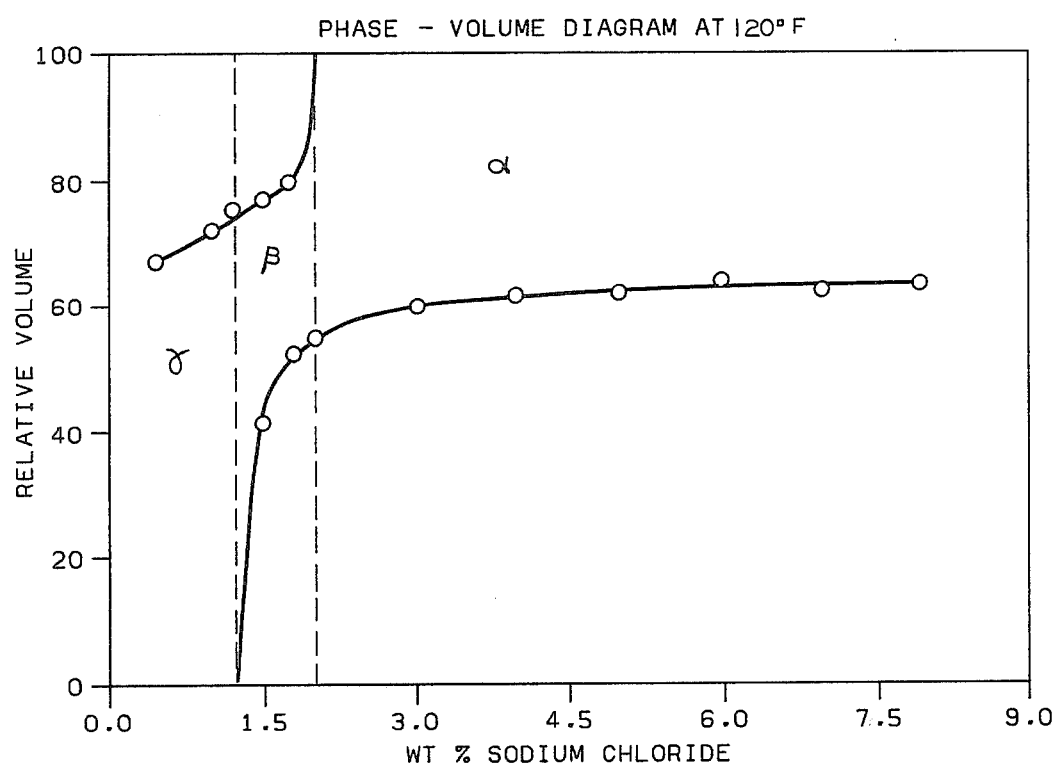
FIG. 3 is a phase-volume diagram similar to FIG. 1 but at 120° F.

In sample numbers 6 and 7, the opaque macroemulsion coalesced into three phases: an upper oil phase containing about 1 weight percent water and 48.5 weight percent of the oil present in the original macroemulsion, a middle transparent microemulsion phase containing surfactant, cosurfactant and about 28.7 weight percent water and about 51.5 weight percent of the oil present in the original macroemulsion, and a bottom aqueous phase. It is an inherent feature of the instant process that the most rapid coalescence results in the appearance of said three phases. Thus, the instant process is applicable to opaque macroemulsions containing salinities higher than the salinity range for the characteristic beta region defined by a phase-volume analysis of the surfactant-oil-cosurfactant system under consideration. It is important that these tests be performed on the produced effluent fluids rather than on the fluids injected into a formation. The reason for this is that changes in the components, such as fractionation of the surfactant or cosurfactant, can occur as the fluids are displaced through the formation and result in changes in the phase-volume behavior. In operation then, the instant process involves dilution of the opaque macroemulsion salinity from the so-called alpha region of a phase-volume diagram into the salinity range of the beta region of a phase-volume diagram to give the rapid coalescence. Further dilution, of course, adjusts the salinity of the opaque macroemulsion into the so-called gamma region of the phase-volume diagram and the coalescence time is dramatically increased. This is unexpected since the driving force for coalescence of emulsions is high interfacial tension, and it has been shown that interfacial tensions are actually minimized in the so-called beta region. A comparison of the phase-volume diagrams, FIGS. 1 and 3, with the coalescence time graphs, FIGS. 2 and 4, reveals that the rate of coalescence is fastest in the so-called beta region where one would expect the coalescence to be slowest because the driving force for coalescence is minimal due to low interfacial tensions in said salinity range.

After dilution of the opaque macroemulsion with the proper amount of water to give the optimum salinity for rapid coalescence, and after the resulting oil phase has been removed, for instance, by decantation or by being pumped off from the lower phases, there still remains the transparent microemulsion phase which contains some oil. Further oil can be recovered from this transparent microemulsion phase as follows.

First, the emulsion is driven to a water-external (gamma type) transparent microemulsion by addition of fresh water. Any oil phase which forms is removed. Next, air is forced through the gamma transparent microemulsion by means of a dispersion device to create a foam. Since the surfactant concentrates at interfaces, the surfactant will concentrate at the air-water interface in the foam. The large surface area of the foam causes a large fraction of the surfactant to concentrate into the foam. Next, the foam is removed from above the gamma transparent microemulsion. This transparent microemulsion, now having a lower surfactant concentration than before the foaming step, is treated with acid and brine of sufficient salinity to drive the system to an oil-external transparent microemulsion. The net effect of this is to reduce the water content of the transparent microemulsion due to the reduction in the amount of surfactant. While there is still some water in the transparent microemulsion, it can be reduced to a point where it is small enough that it can be tolerated.

While this invention has been described in detail for the purpose of illustration, it is not meant to be limited thereby but is intended to cover all changes and modifications within the spirit and scope thereof.

I claim:

1. A process comprising:
   (a) forming a diluted system by adding to an opaque macroemulsion system made up of oil, a surfactant, water, and an electrolyte having a sodium chloride equivalent concentration in said opaque macroemulsion of at least 2 weight percent based on the weight of water; an amount of water such that the thus formed diluted system coalesces into a predominantly oil upper phase, a transparent microemulsion middle phase containing oil, surfactant, water and electrolyte and an aqueous lower phase;
   (b) allowing said diluted system to so coalesce; and
   (c) recovering oil from said upper phase.

2. A process according to claim 1 wherein said opaque macroemulsion also contains a cosurfactant.

3. A process according to claim 2 wherein said opaque macroemulsion is recovered from a producing well in an oil reservoir system utilizing a transparent microemulsion in post-primary oil recovery.

4. A method according to claim 3 wherein said surfactant is a petroleum sulfonate and said cosurfactant is an alcohol.

5. A method according to claim 4 wherein said petroleum sulfonate has an average equivalent weight within the range of 375 to 500, said cosurfactant is isobutyl alcohol, and said electrolyte is predominantly sodium chloride.

6. A method according to claim 5 wherein said transparent microemulsion phase produced on said coalescence is diluted with water to drive it to a water external condition, air is introduced to create a foam, the foam is removed and the remaining transparent microemulsion is mixed with acid and brine of sufficient salinity to drive said remaining transparent microemulsion to an oil-external transparent microemulsion.

7. A method according to claim 2 wherein said transparent microemulsion phase produced on said coalescence is diluted with water to drive it to a water external condition, air is introduced to create a foam, the foam is removed and the remaining transparent microemulsion is mixed with acid and brine of sufficient salinity to drive said remaining transparent microemulsion to an oil-external transparent microemulsion.

8. A method according to claim 1 wherein the degree of dilution employed is optimized by preparing a plurality of mixtures of said opaque macroemulsion and pure water at various concentrations of pure water, agitating said mixtures, allowing time for coalescence, measuring coalescence time, and from the results obtained selecting the amount of added water to obtain minimum coalescence time.

9. A method according to claim 8 wherein the surfactant is a petroleum sulfonate.

10. A method according to claim 9 wherein the opaque macroemulsion also contains a cosurfactant.

11. A method according to claim 10 wherein the petroleum sulfonate has an average equivalent weight within the range of 375 to 500, the cosurfactant is isobutyl alcohol, and the electrolyte is predominantly sodium chloride.

* * * * *